(12) United States Patent
Hung et al.

(10) Patent No.: US 9,201,550 B2
(45) Date of Patent: Dec. 1, 2015

(54) MUTUAL CAPACITIVE TOUCH PANEL AND TOUCH CONTROL SYSTEM

(71) Applicant: MStar Semiconductor, Inc., Hsinchu Hsien (TW)

(72) Inventors: Guo-Kiang Hung, Hsinchu Hsien (TW); Ting-Hao Yeh, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 182 days.

(21) Appl. No.: 13/834,683

(22) Filed: Mar. 15, 2013

(65) Prior Publication Data

US 2014/0009437 A1    Jan. 9, 2014

(30) Foreign Application Priority Data

Jul. 5, 2012    (TW) ............................... 101124270 A

(51) Int. Cl.
  *G06F 3/044*    (2006.01)
(52) U.S. Cl.
  CPC ...... *G06F 3/044* (2013.01); *G06F 2203/04103* (2013.01)
(58) Field of Classification Search
  CPC .................... G06F 3/044; G06F 2203/04103
  USPC ........................................................ 345/174
  See application file for complete search history.

(56) References Cited

U.S. PATENT DOCUMENTS

| | | | |
|---|---|---|---|
| 7,663,607 B2* | 2/2010 | Hotelling et al. | 345/173 |
| 8,217,902 B2* | 7/2012 | Chang et al. | 345/173 |
| 2007/0074914 A1* | 4/2007 | Geaghan et al. | 178/18.06 |
| 2007/0247443 A1* | 10/2007 | Philipp | 345/173 |
| 2009/0091551 A1* | 4/2009 | Hotelling et al. | 345/174 |
| 2009/0314621 A1* | 12/2009 | Hotelling | 200/600 |
| 2010/0013800 A1* | 1/2010 | Elias et al. | 345/178 |
| 2010/0035030 A1* | 2/2010 | Huang et al. | 428/201 |
| 2010/0079393 A1* | 4/2010 | Dews | 345/173 |
| 2010/0149108 A1* | 6/2010 | Hotelling et al. | 345/173 |
| 2011/0025639 A1* | 2/2011 | Trend et al. | 345/174 |
| 2011/0216038 A1* | 9/2011 | Stolov et al. | 345/174 |
| 2012/0105752 A1* | 5/2012 | Park et al. | 349/33 |
| 2012/0229414 A1* | 9/2012 | Ellis | 345/174 |
| 2012/0242606 A1* | 9/2012 | Mackey | 345/173 |
| 2012/0262419 A1* | 10/2012 | Hershman et al. | 345/174 |
| 2013/0033450 A1* | 2/2013 | Coulson et al. | 345/174 |
| 2013/0038378 A1* | 2/2013 | Singh et al. | 327/517 |
| 2013/0154991 A1* | 6/2013 | Yilmaz | 345/174 |
| 2013/0249858 A1* | 9/2013 | Chang | 345/174 |
| 2013/0321324 A1* | 12/2013 | Golovchenko et al. | 345/174 |

* cited by examiner

*Primary Examiner* — Jonathan Horner
(74) *Attorney, Agent, or Firm* — Edell, Shapiro & Finnan, LLC

(57) ABSTRACT

A single-layer mutual capacitive touch panel operable under control of a controller is provided. The mutual capacitive touch panel includes a first driving electrode, a second driving electrode, N number of first receiving electrodes surrounding the first driving electrode, M number of second receiving electrodes surrounding the second driving electrode, a driving channel, and (N+M) number of receiving channels. The controller simultaneously sends a driving signal to the first driving electrode and the second driving electrode via the driving channel. When sending the driving signal, the controller receives (N+M) number of sensing results via the (N+M) number of receiving channels. The N number of first receiving electrodes and the M number of second receiving electrodes correspond to different receiving channels.

8 Claims, 6 Drawing Sheets

▷ or ◁ : fixed receiving electrode

▷ or ◁ : fixed driving electrode

▷ or ◁ : switchable as driving electrode or as receiving electrode

MUTUAL CAPACITIVE TOUCH PANEL AND TOUCH CONTROL SYSTEM This application claims the benefit of Taiwan application Serial No. 101124270, filed Jul. 5, 2012, the subject matter of which is incorporated herein by reference.

BACKGROUND OF THE INVENTION

1. Field of the Invention

The invention relates in general to a touch control system, and more particularly, to a technique for implementing touch control by single-layer electrodes.

2. Description of the Related Art

Operating interfaces of recent electronic products have become more and more user-friendly and intuitive as technology advances. For example, via a touch screen, a user can directly operate programs as well as input messages/texts/patterns with fingers or a stylus; in this way, it is much easier to convey commands than operating via traditional input devices such as a keyboard or buttons. In practice, a touch screen usually comprises a touch sensing panel and a display device disposed at the back of the touch sensing panel. According to a position of a touch on the touch sensing panel and a currently displayed image on the display device, an electronic device determines an intention of the touch to execute corresponding operations.

Current touch control techniques are in general categorized into resistive, capacitive, electromagnetic, ultrasonic and optic types. The capacitive touch control technique can further be categorized into self capacitive and mutual capacitive types. In contrast to a mutual capacitive touch panel, although being implementable by a simpler single-layer electrode structure, a self capacitive touch panel falls short in supporting multi-touch control. Consequently, a mutual capacitive touch panel provides a far broader application scope than a self capacitive touch panel.

FIG. 1 shows a mutual capacitive touch panel according to the prior art. A plurality of transparent sensing wires, arranged in a matrix, are disposed at the back of the touch sensing panel. In this mutual capacitive touch panel, the sensing wires in an X direction are driving lines whereas the sensing wires in a Y direction are sensing lines. With reference to FIG. 1, each of the driving lines is connected to a driver 12, and each of the sensing lines is connected to a receiver 14. Generally, the drivers 12 sequentially send driving signals, and the receivers 14 continuously receive sensing signals. When a valid touch takes place, capacitance coupling occurs across the driving line and the sensing line corresponding to the touch point, resulting in a change in the corresponding sensing signal (e.g., a voltage value) associated with a mutual capacitance. According to the receiver 14 which detects the change in the sensing signal and the driver 12 which sends out the driving signal at the time of the touch, a subsequent circuit determines coordinates of the touch point with respect to the X and Y directions.

Conventionally, driving lines and sensing lines are respectively transparent electrodes disposed on different planes. FIG. 2A shows a diagram of a currently prevalent rhombus electrode pattern. Dark-shaded rhombus electrodes 16 having the same Y coordinate are serially connected to one another to form driving lines in the X direction; lightly-shaded rhombus electrodes 18 having the same X coordinate are serially connected to one another to form driving lines in the Y direction. It should be noted that the dark-shaded rhombus electrodes 16 and the lightly-shaded rhombus electrodes 18 are located on different planes, and parts of the two types of electrodes appearing as overlapping in the diagram are physically unconnected.

To reduce material costs, many manufacturers compress the foregoing double-layer electrode structure to a single-layer electrode structure. In a conventional single-layer electrode structure, principal rhombus electrodes of the dark-shaded rhombus electrodes 16 and the lightly-shaded rhombus electrodes 18 are formed on a same plane. Referring to FIG. 2B showing a top view of the single-layer electrode structure in FIG. 2A, parts of the two types appearing as overlapping in the diagram are implemented as three-dimensional bridge structures. In this example, a connecting line between two dark-shaded rhombus electrodes 16 is located on a same plane as the principal rhombus electrodes; a connecting line between each two lightly-shaded rhombus electrodes 18 is elevated to be in fact above the plane—as indicated crossing over the dark connecting line in the diagram. It is observed from the diagram that the conventional single-layer electrode structure is substantially not a real single-layer structure. Due to complex manufacturing procedures and a low yield rate of the foregoing three-dimensional bridge structures, the implementation of the current single-layer electrode structure may increase overall manufacturing complications and costs instead.

Moreover, the drivers 12 and the receivers 14 are frequently disposed in a circuit chip connected to a printed circuit board in a sensing panel. As the number of driving/receiving channels coupling the sensing panel and the circuit chip grows, the number of pins of the circuit chip also increases to result in even higher production costs.

SUMMARY OF THE INVENTION

To satisfy requirements of implementing multi-touch control by a single-layer electrode structure and reducing the number of pins between a panel and a circuit chip, the invention is directed to a mutual capacitive touch panel and a mutual capacitive touch system. In the mutual capacitive touch panel and the mutual capacitive touch system disclosed in the present invention, a single-layer electrodes structure free of a three-dimensional bridge is adopted, and channels between a panel and a circuit chip can be shared by the electrodes through appropriate arrangements of driving electrodes and receiving electrodes. Compared to the prior art, the panel and the system disclosed by the present invention effectively reduce manufacturing complications and production costs as well as achieving multi-touch control.

According to an embodiment of the present invention, a single-layer mutual capacitive touch panel operable under control of a controller is provided. The mutual capacitive touch panel includes a first driving electrode, a second driving electrode, N number of first receiving electrodes, M number of second receiving electrodes, a driving channel, and (N+M) number of receiving channels. The N number of first receiving electrodes surround the first driving electrode. The M number of second receiving electrodes surround the second driving electrode. The controller simultaneously sends a driving signal to the first driving electrode and the second driving electrode via the driving channel. The (N+M) number of receiving channel respectively correspond to one of the N number of first receiving electrodes and the M number of second receiving electrodes. The N number of first receiving electrodes and the M number of second receiving electrodes respectively correspond to different receiving channels. When sending the driving signal, the controller receives (N+M) number of sensing results via the (N+M) number of receiving channels. N and M are positive integers.

According to another embodiment of the present invention, a single-layer mutual capacitive touch panel operable with a controller is provided. The mutual capacitive touch panel includes a first driving electrode, a second driving electrode, a plurality of first receiving electrodes, a plurality of second receiving electrodes, two driving channels and a receiving channel. The first receiving electrodes surround the first driving electrode. The second receiving electrodes surround the second driving electrode. The two driving channels respectively correspond to the first driving electrode and the second driving electrode. The controller respectively sends a driving signal to the first driving electrode and the second driving electrode in a time-division manner via the two driving channels. The receiving channel connects to one of the first receiving electrodes and one of the second receiving electrodes. The controller receives a sensing result via the receiving channel.

According to another embodiment of the present invention, a single-layer mutual capacitive touch system is provided. The mutual capacitive touch system includes a first driving electrode, a second driving electrode, N number of first receiving electrodes, M number of second receiving electrodes, a driving channel, (N+M) number of receiving channels and a controller. The N number of first receiving electrodes surround the first driving electrode. The M number of second receiving electrodes surround the second driving electrode. The (N+M) number of receiving channel respectively correspond to one of the N number of first receiving electrodes and the M number of second receiving electrodes. The N number of first receiving electrodes and the M number of second receiving electrodes respectively correspond to different receiving channels. The controller simultaneously sends a driving signal to the first driving electrode and the second driving electrode via the driving channel. When sending the driving signal, the controller receives (N+M) number of sensing results via the (N+M) number of receiving channels. N and M are positive integers.

According to yet another embodiment of the present invention, a single-layer mutual capacitive touch system is provided. The mutual capacitive touch system includes a first driving electrode, a second driving electrode, a plurality of first receiving electrodes, a plurality of second receiving electrodes, two driving channels, a receiving channel and a controller. The first receiving electrodes surround the first driving electrode. The second receiving electrodes surround the second driving electrode. The two driving channels respectively correspond to the first driving electrode and the second driving electrode. One of the first receiving electrodes and one of the second receiving electrodes are connected to the connecting channel. The controller sends a driving signal to the first driving electrode and the second driving electrode in a time-division manner via the two driving channels. The controller receives a sensing result via the receiving channel.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
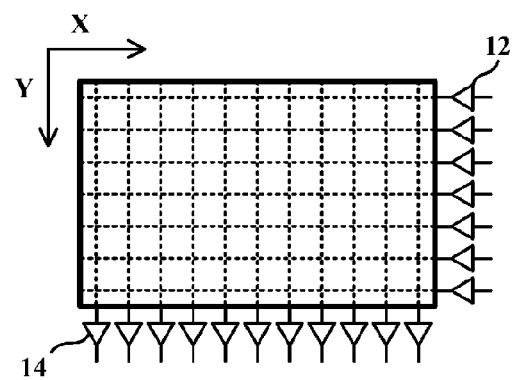
FIG. 1 is an exemplary mutual capacitive touch panel.
Figure 2A:
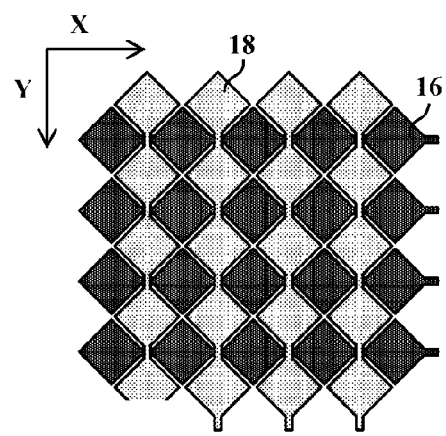
FIG. 2A is a schematic diagram of rhombus electrodes.
Figure 2B:
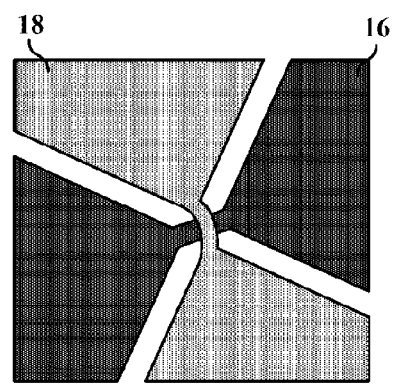
FIG. 2B is a diagram of a three-dimensional bridge structure in a conventional single-layer electrode structure.
Figure 3A:
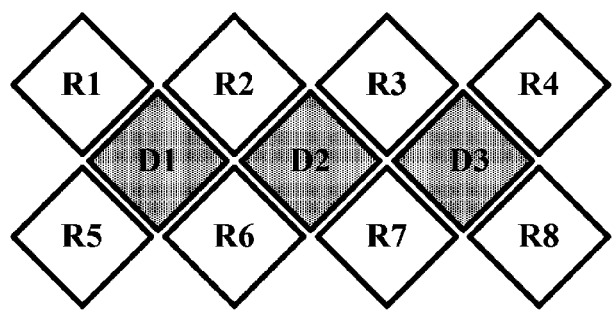
FIG. 3A is an exemplary arrangement of electrodes according to an embodiment of the present invention.

In a mutual capacitive touch panel according to an embodiment of the present invention, driving electrodes and receiving electrodes respectively have a planar profile of a rhombus shape. FIG. 3A shows an arrangement of electrodes according to an embodiment of the present invention. For illustrative purposes, merely three driving electrodes D1 to D3 and adjacent receiving electrodes R1 to R8 in the mutual capacitive touch panel are depicted in FIG. 3A.

Power lines that are affected by a user touch are mainly distributed at the driving electrodes and between parallel borders of the adjacent receiving electrodes. For example, a sensing region is defined between the driving electrode D1 and the receiving electrode R1, and another sensing region is defined between the driving electrode D1 and the receiving electrode R2. Accordingly, the driving electrodes D1 to D3 respectively correspond to four different sensing regions. When a controller (not shown) cooperating with the mutual capacitive touch panel sends out a driving signal to the driving electrode D1, the controller concurrently prompts the receiving electrodes R1, R2, R5 and R6 to receive sensing results, and determines whether a user touches the four sensing regions around the driving electrode D1 according to the four sensing results. Similarly, when the controller sends out a driving signal to the driving electrode D3, the controller concurrently prompts the receiving electrodes R3, R4, R7 and R8 to receive sensing results, and determines whether a user touches the four sensing regions around the driving electrode D3 according to the four sensing results.

Figure 3B:
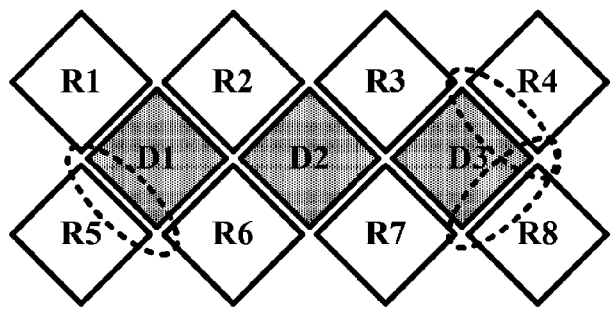
FIG. 3B and FIG. 3C depict sensing regions between the electrodes.

In this embodiment, the controller simultaneously sends out a driving signal to the driving electrodes D1 and D3, and receives the sensing results from the receiving electrodes R1 to R8 when sending out the driving signal. Since the eight sensing regions R1 to R8 corresponding to the driving electrodes D1 and D3 are isolated, the controller is nevertheless capable of clearly identifying the touched sensing regions even when several of the sensing regions R1 to R8 are simultaneously touched, thereby implementing multi-touch control. For example, referring to FIG. 3B, when the controller finds that changes simultaneously occur in the sensing signals provided by the sensing regions R4, R5 and R8, the controller determines that three dotted regions in FIG. 3B are touched by a user.

It is concluded from the above operations that, based on the same driving signal simultaneously sent to the driving electrodes D1 and D3 by the controller, the driving electrodes D1 and D3 may share a driving channel connecting to the controller. Compared to different driving channels connecting the driving electrodes D1 and D3 to the controller, the shared driving channel can reduce the number of pins of a chip carrying the controller. Even if driving channel sharing is not employed, the controller can also simultaneously send out the driving signal to the driving electrodes D1 and D3 to shorten the time for scanning the entire mutual capacitive touch panel. In brief, two electrodes sharing a same channel must be driven/receive sensing signals at the same time, whereas two electrodes not sharing a same channel may also be driven/receive sensing signals at the same time.

Moreover, to prevent the controller from being confused with the sensing results, when the driving electrodes D1 and D3 share the driving channel connecting to the controller or when the controller simultaneously sends the driving signal to the driving electrodes D1 and D3, any two random receiving electrodes among the receiving electrodes R1 to R8 should be prohibited from sharing a receiving channel connecting to the controller. In other words, eight different receiving channels between the receiving electrodes R1 to R8 and the controller are required for respectively corresponding to the receiving electrodes R1 to R8. In practice, the controller may simultaneously receive the sensing results from the receiving electrodes R1 to R8, and may also sequentially receive the eight sensing results when sending the driving signal.

Figure 3C:
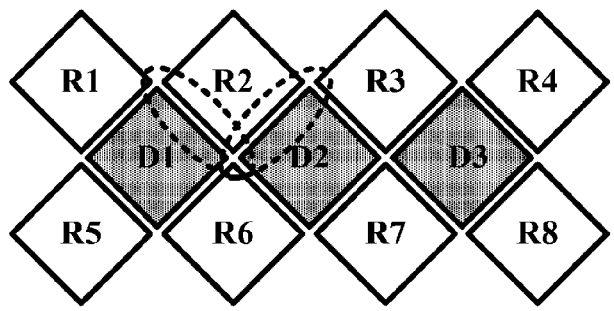

On the other hand, in this embodiment, since the driving electrodes D1 and D2 jointly correspond to the receiving electrodes R2 and R6, the controller does not simultaneously send the driving signal to the driving electrodes D1 and D2. If the controller simultaneously sends the driving signal to the electrodes D1 and D2, the controller will be incapable of identifying which of the sensing regions in dotted lines in FIG. 3C is touched by a user when the controller discovers that a change occurs in the sensing signal provided by the electrode R2.

Figure 4A:
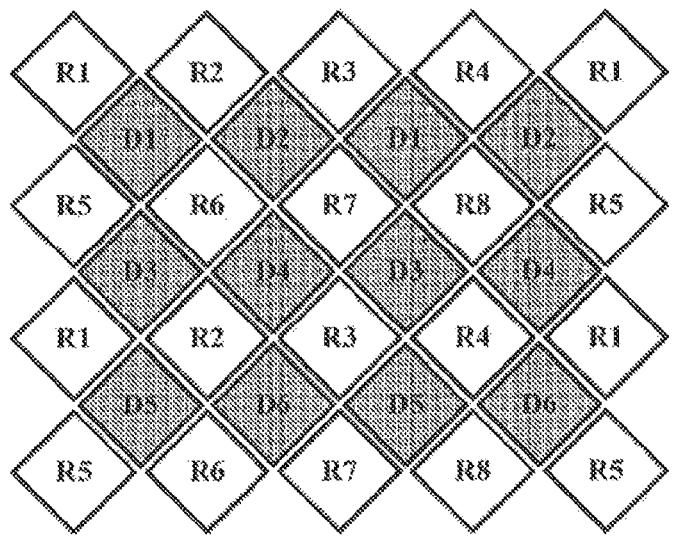
FIG. 4A is an exemplary arrangement of electrodes according to an embodiment of the present invention.

FIG. 4A depicts a greater number of driving electrodes and adjacent receiving electrodes in a mutual capacitive touch panel according to another embodiment of the present invention. In this embodiment, electrodes sharing a same channel are denoted the same. Taking two driving electrodes D1 in FIG. 4A for example, four receiving electrodes R1, R2, R5 and R6 corresponding to the left side are completely different from four receiving electrodes R3, R4 and R7 and R8 corresponding to the right side, with receiving channels of the eight receiving electrodes being different from one another. That is to say, given that receiving electrodes corresponding to two driving electrodes are different, and receiving channels connecting to the two driving electrodes are also different, the two electrodes may share a same driving channel.

From another perspective, two driving electrodes driven by a controller at different time points may physically share at least one receiving electrode (e.g., the leftmost driving electrodes D1 and D3 share the receiving electrodes R5 and R6). More specifically, two driving electrodes driven by a controller at different time points may physically share a receiving electrode connecting to a same receiving channel (e.g., the leftmost driving electrodes D1 and D5 share receiving electrodes R1, R2, R5 and R6 that are physically different but connect to the same receiving channels).

It should be noted that, based on actual requirements (e.g., costs or wiring considerations), shared driving/receiving channels may optionally be designed for driving/receiving electrodes. The embodiment in FIG. 4A at the same time includes driving electrodes with shared driving channels and receiving electrodes with shared receiving channels, with the numbers of shared driving channels and shared receiving channels being maximized. In a situation that no shared channels are employed, 12 different driving channels and 20 different receiving channels are needed. In contrast, by maximizing the numbers of shared driving channels and shared receiving channels according to the approach of the present invention, only 6 driving channels and 8 receiving channels are required. In another embodiment, it may be designed that only driving electrodes share driving channels, or only receiving electrodes share receiving channels. In yet another embodiment, it may be designed that only a part of driving electrodes share driving channels, and only a part of receiving electrodes share receiving channels.

Figure 4B:
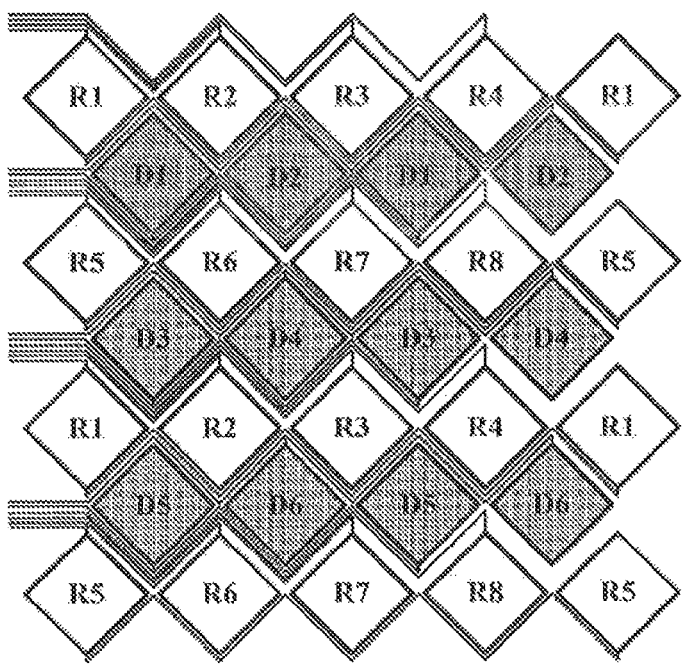
FIG. 4B is an exemplary arrangement of wires among driving/receiving channels of the electrodes according to an embodiment of the present invention.

FIG. 4B shows wiring of driving/receiving channels of the electrodes according to an embodiment of the present invention. It should be noted that, the driving electrodes D1 to D6, the receiving electrodes R1 to R8 and the channels may all be disposed on a same plane, and all the driving channels and receiving channels do not overlap one another, such that the conventional three-dimensional bridge structure is not required. In practice, the number, shape and arrangement of the electrode components are not limited to those shown in FIG. 4B, and the wiring may be more densely distributed to shorten distances between adjacent electrodes. It should be noted that the connections of channels can be implemented on a printed circuit board between the touch panel and the controller, and are not limited to the wires on the touch panel.

Thus, it is demonstrated by the described embodiments that, the mutual capacitive touch panel of the present invention is capable of satisfying requirements of implementing multi-touch control by a single-layer electrode structure and reducing the number of pins between a panel and a circuit chip.

Figure 5A:
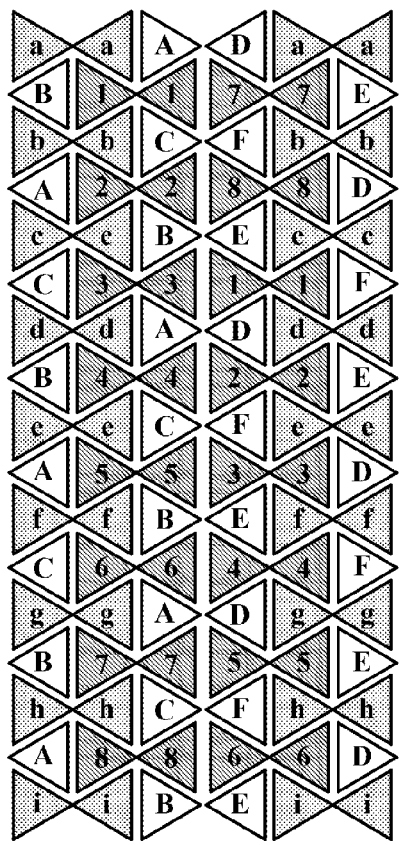
FIG. 5A is an exemplary arrangement of electrodes according to another embodiment of the present invention.
Figure 5B:
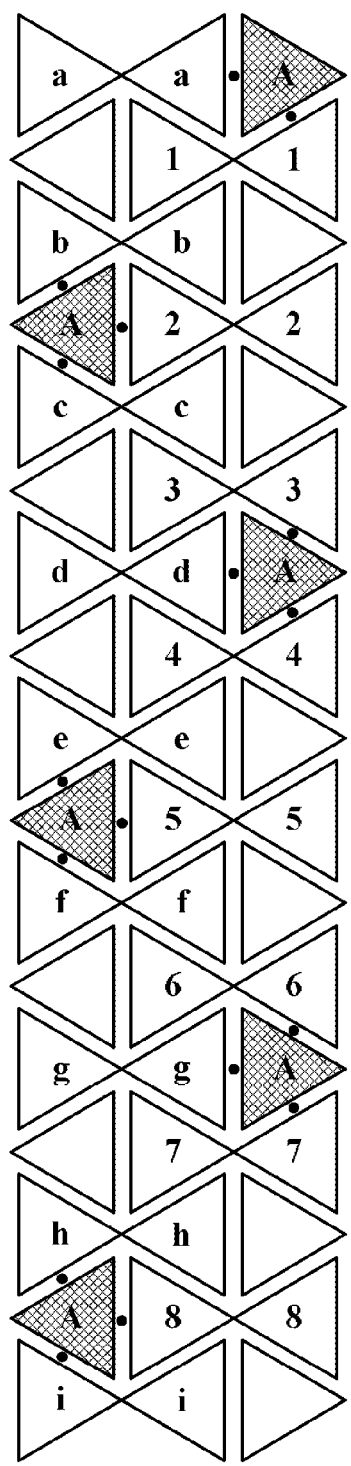
FIG. 5B and FIG. 5C depict operation logic of the electrodes.
Figure 5C:
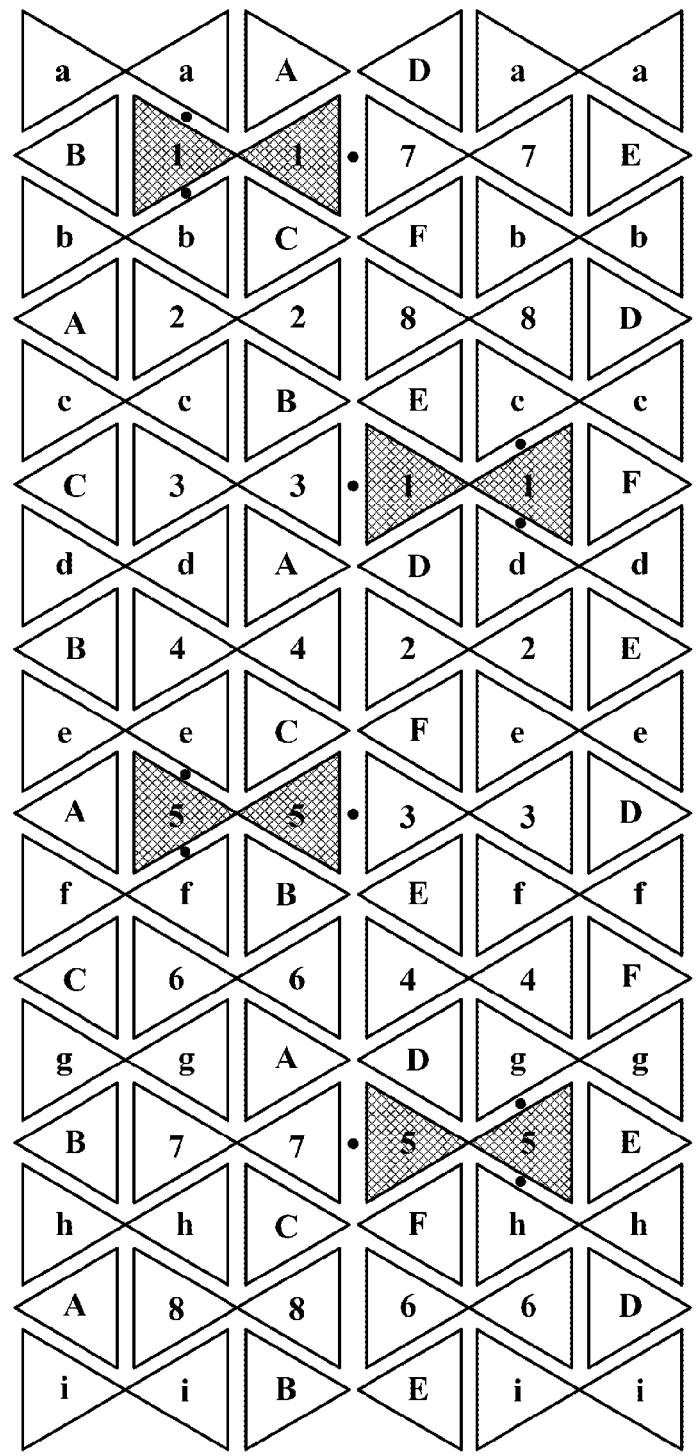

A mutual capacitive touch panel is provided according to another embodiment of the present invention. Driving electrodes and receiving electrodes respectively have a planar profile of a triangle shape. FIG. 5A shows an exemplary arrangement of the electrodes. To maintain a clear depiction, channels connecting to the electrodes and the controller are not shown in FIG. 5A. The electrodes having the same denotation are connected to a same channel. The electrodes "a" to "i" are fixed receiving electrodes, the electrodes "A" to "F" are fixed driving electrodes, and the electrodes "1" to "8" are interchangeable electrodes (i.e., being switchable as receiving electrodes or as driving electrodes). In FIG. 5B, the controller sets the interchangeable electrodes "1" to "8" as receiving electrodes that drive six driving electrodes "A" at the left half plane via a single driving channel. Solid dots marked between the electrodes in FIG. 5B represent central positions of sensing regions for detecting a user touch. FIG. 5C is for illustrating operation details of the controller setting the interchangeable electrodes "1" and "5" as driving electrodes and setting the interchangeable electrodes "3" and "7" as receiving electrodes. In FIG. 5C, solid dots also represent central positions of sensing regions for detecting a user touch. By in turn driving the electrodes "A" to "F" and the interchangeable electrodes "1" to "8" through time-division, the whole mutual capacitive touch panel can be sensed. Control logic of other electrodes can be derived accordingly, and shall be omitted herein.

As previously described, given that receiving electrodes corresponding to two driving electrodes are different and receiving channels connecting the two driving electrodes are also different, the two driving electrodes may share a same driving channel. Moreover, two receiving electrodes may also share a same receiving channel as long as driving electrodes corresponding to the two receiving electrodes are not driven at the same time. It is observed from FIG. 5A that the above embodiment needs six driving channels, nine receiving channels and eight interchangeable channels—such numbers of the channels are apparently less than the number of the electrodes. A common feature of the embodiment in FIG. 5A with the previous embodiment is that the electrodes and the channels can also be disposed on a same plane without requiring the three-dimensional bridge structure.

In addition to the foregoing mutual capacitive touch panel (as shown in FIG. 4A or 5A), a mutual capacitive touch system further including a controller is provided according to another embodiment of the present invention. For example, the mutual capacitive touch panel of the present invention may be integrated to an electronic system such as a mobile communication apparatus, a tablet computer, a personal computer or an interactive information display board.

Therefore, to satisfy requirements of implementing multi-touch control by a single-layer electrode structure and reducing the number of pins between a panel and a circuit chip, a mutual capacitive touch panel and a mutual capacitive touch system are disclosed. In the mutual capacitive touch panel and the mutual capacitive touch system disclosed by the present invention, single-layer electrodes free of a three-dimensional bridge structure are adopted, and channels between a panel and a circuit chip can be shared by the electrodes through appropriate arrangements of driving electrodes and receiving electrodes. Compared to the prior art, the panel and the system disclosed by the present invention effectively reduce manufacturing complications and production costs as well as achieving multi-touch control.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A single-layer mutual capacitive touch panel, operable under control of a controller, comprising:
    a first driving electrode;
    a second driving electrode;
    N number of first receiving electrodes, surrounding the first driving electrode, each side of the first driving electrode corresponding to one of the first receiving electrodes;
    M number of second receiving electrodes, surrounding the second driving electrode, each side of the second driving electrode corresponding to one of the second receiving electrodes;
    a driving channel, through which the controller simultaneously sends a driving signal to the first driving electrode and the second driving electrode; and
    (N+M) number of receiving channels, respectively corresponding to one of the N number of first receiving electrodes and the M number of second receiving electrodes;
    wherein, the N number of first receiving electrodes and the M number of second receiving electrodes respectively correspond to different receiving channels, the controller receives (N+M) number of sensing results via the (N+M) number of receiving channels when sending the driving signal, and N and M are positive integers;
    a third driving electrode, wherein the controller drives the first driving electrode and the third driving electrode in a time-division manner; and
    P number of third receiving electrodes, corresponding to the third driving electrode;
    wherein, P is a positive integer, and one of the P number of third receiving electrodes and one of the N number of first receiving electrodes connect to a same receiving channel,
    wherein planar profiles of the first driving electrode, the second driving electrode, the third driving electrode, the N number of first receiving electrodes, the M number of second receiving electrodes and the P number of third receiving electrodes are rhombuses, and
    wherein N, M and P are equal to 4, the first driving electrode, the third driving electrode and the second driving electrode are adjacently arranged in a row by vertices thereof, the four first receiving electrodes encompass four edges of the first driving electrodes, the four second receiving electrodes encompass four edges of the second driving electrode, and the four third receiving electrodes encompass four edges of the third driving electrode; two of the four first receiving electrodes act as two of the four third receiving electrodes, and two of the four second receiving electrodes act as the remaining two of the four third receiving electrodes.

2. The mutual capacitive touch panel according to claim 1, wherein the first driving electrode and the second driving electrode connect to a same driving channel.

3. The mutual capacitive touch panel according to claim 1, wherein the controller simultaneously receives the (N+M) number of sensing results via the (N+M) receiving channels.

4. The mutual capacitive touch panel according to claim 1, wherein planar profiles of the first driving electrode, the second driving electrode, the N number of first receiving electrodes and the M number of second receiving electrodes are rhombuses.

5. A single-layer mutual capacitive touch system, comprising:
    a first driving electrode;
    a second driving electrode;
    N number of first receiving electrodes, surrounding the first driving electrode, each side of the first driving electrode corresponding to one of the first receiving electrodes;
    M number of second receiving electrodes, surrounding the second driving electrode, each side of the second driving electrode corresponding to one of the second receiving electrodes;
    a driving channel;
    (N+M) number of receiving channels, respectively corresponding to one of the N number of first receiving electrodes and the M number of second receiving electrodes; and
    a controller, simultaneously sending a driving signal to the first driving electrode and the second driving electrode through the driving channel, and receives (N+M) sensing results through the (N+M) receiving channels when sensing the driving signal, where N and M are positive integers;
    a third driving electrode, wherein the controller drives the first driving electrode and the third driving electrode at different time points; and
    P number of third receiving electrodes, corresponding to the third driving electrode;
    wherein, P is a positive integer, and one of the P number of third receiving electrodes and one of the N number of first receiving electrodes connect to a same receiving channel,
    wherein planar profiles of the first driving electrode, the second driving electrode, the third driving electrode, the N number of first receiving electrodes, the M number of second receiving electrodes and the P number of third receiving electrodes are rhombuses, and
    wherein N, M and P are equal to 4, the first driving electrode, the third driving electrode and the second driving electrode are adjacently arranged in a row by vertices thereof, the four first receiving electrodes encompass four edges of the first driving electrodes, the four second receiving electrodes encompass four edges of the second driving electrode, and the four third receiving electrodes encompass four edges of the third driving electrode; two of the four first receiving electrodes act as two of the four third receiving electrodes, and two of the four second receiving electrodes act as the remaining two of the four third receiving electrodes.

6. The mutual capacitive touch system according to claim 5, wherein the first driving electrode and the second driving electrode connect to a same driving channel.

7. The mutual capacitive touch system according to claim 5, wherein the controller simultaneously receives the (N+M) number of sensing results via the (N+M) receiving channels.

8. The mutual capacitive touch system according to claim 5, wherein planar profiles of the first driving electrode, the second driving electrode, the N number of first receiving electrodes and the M number of second receiving electrodes are rhombuses.

* * * * *